UNITED STATES PATENT OFFICE.

JOHN W. HYATT, OF NEWARK, NEW JERSEY.

IMPROVEMENT IN STAINING WOOD.

Specification forming part of Letters Patent No. 209,568, dated November 5, 1878; application filed December 13, 1877.

*To all whom it may concern:*

Be it known that I, JOHN W. HYATT, of Newark, in the county of Essex and State of New Jersey, have invented a new and useful Improvement in Dyes, of which the following is a specification, reference being had to the accompanying drawings.

Heretofore, so far as known, all dye-stuffs for the purpose of producing an ebony appearance have been used only in or in connection with some aqueous solution; but mixtures containing water are very objectionable, as they cause the swelling or distention of the wood or fibrous material when applied thereto, and as a result render such surface uneven, which necessitates a subsequent operation for smoothing the surface thus treated.

It has been discovered that alcohol or methylic spirit, or both combined, will effect the solution of the solid extract of logwood, and that such solution, when used in conjunction with the tincture of muriate of iron, produces a very efficient ebony dye free from said objections.

The preferred formula is one that contains the ingredients aforesaid in about the following proportions, though no limitation as to proportion is admitted: tincture of muriate of iron, eight (8) parts; extract of logwood, (solid,) seven (7) parts; alcohol or methylic spirit, or both combined, thirty-seven (37) parts.

The composition, omitting the tincture of muriate of iron, may be applied, and the omitted ingredient then used upon the same surface, the jet-black hue being developed by the latter application.

In the manner last above indicated the wooden or analogous surface may readily be mottled or grained, checkered, or otherwise ornamented by applying the tincture of the muriate of iron to those particular parts only of the surface whereat the ebony hue is desired, which permits the original color of the wood to be retained upon the remainder of the surface.

The invention is not restricted to any proportions other than such as may be efficient to produce a dye that will effect the desired result.

What I claim as my invention, and desire to secure by Letters Patent, is—

1. The combination, with the solid extract of logwood dissolved in alcoholic or methylic spirit, or both, of the tincture of muriate of iron, whereby a dye for producing an ebony appearance is formed, substantially as specified.

2. The process herein described for producing an ebony appearance, which consists in treating a surface with the solid extract of logwood dissolved in alcoholic or methylic spirit, or both, and then applying to the surface thus treated the tincture of muriate of iron, or the reverse of said process, substantially as specified.

In testimony that I claim the foregoing improvement in dyes, as above described, I have hereunto set my hand this 19th day of November, 1877.

JOHN WESLEY HYATT.

Witnesses:
SAML. S. TIFFANY,
H. L. JOHNSTON.